Feb. 28, 1950

C. L. HINSDALE 2,499,221

PHONOGRAPH RECORD RACK

Filed Oct. 30, 1947

INVENTOR.
Clare L. Hinsdale.
BY W. B. Harpman
ATTORNEY.

Patented Feb. 28, 1950

2,499,221

UNITED STATES PATENT OFFICE 2,499,221

PHONOGRAPH RECORD RACK

Clare L. Hinsdale, Girard, Ohio

Application October 30, 1947, Serial No. 783,153

1 Claim. (Cl. 211—40)

This invention relates to a storage rack for phonograph records and more particularly to a rack formed of a plurality of identical parts.

The principal object of the invention is the provision of a rack for phonograph record storage which will hold a plurality of phonograph records in separate groups.

A further object of the invention is the provision of a rack for phonograph records, the rack being formed of a plurality of identical molded sections placed in oppositely disposed relation to form several cradles for the reception of a number of phonograph records.

A still further object of the invention is the provision of a rack for phonograph records which may be economically formed primarily of a single molded shape.

A still further object of the invention is the provision of a rack for phonograph records and comprising a plurality of cradles in common pivotal relationship, each cradle capable of holding a plurality of records therein in two-point suspension.

The phonograph record rack disclosed herein comprises an improvement over the Rack for phonograph records disclosed in my co-pending application filed April 9, 1946, Serial No.660,654, wherein a similar device is disclosed. The structure of the present disclosure, however, comprises a substantial improvement in that a single molded part is used for the formation of each of the plurality of cradles comprising the device.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
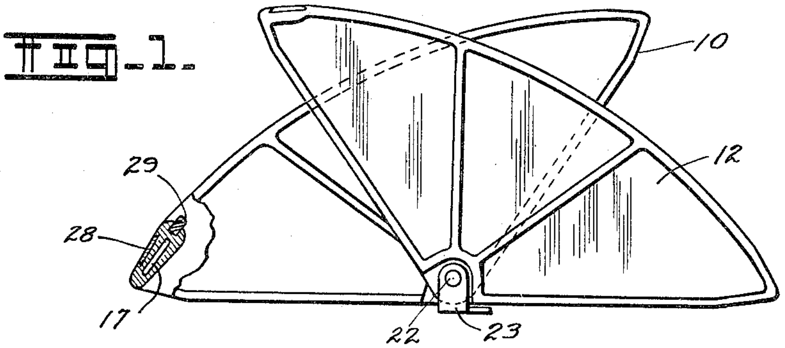
Figure 1 is a side view of a phonograph record rack with the cradles in open and closed position.
Figure 2:
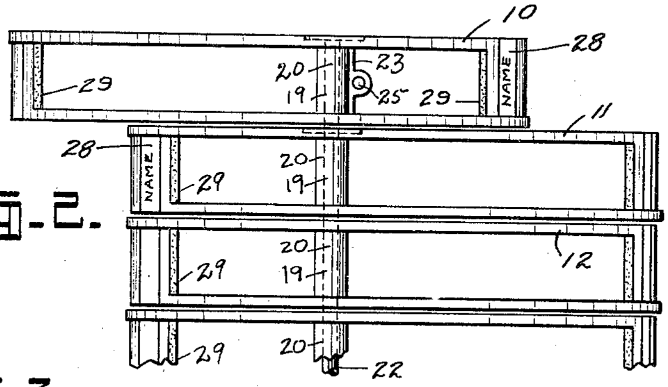
Figure 2 is a top view of the phonograph record rack shown in Figure 1.
Figures 3, 4:
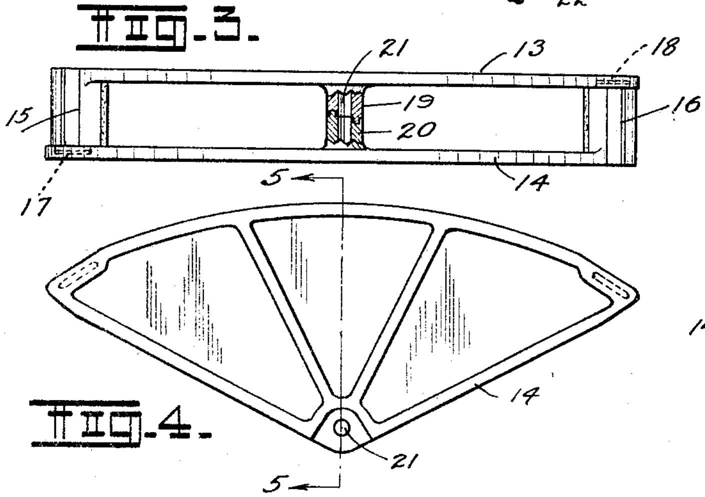
Figure 3 is a bottom view of one of the cradle portions of the phonograph record rack shown in Figures 1 and 2 with parts broken away and parts in cross section.
Figure 4 is a side view of the cradle portion of the phonograph record rack shown in Figure 3.
Figure 5:
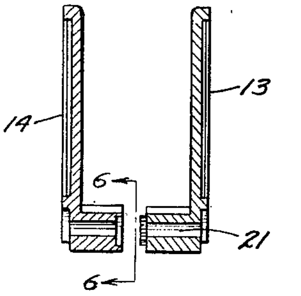
Figure 5 is a vertical cross section taken on line 5—5 of Figure 4.

By referring to the drawings and Figures 1 and 2 in particular it will be seen that a phonograph record rack has been disclosed which is adapted to be positioned in a cabinet or other enclosure to contain a plurality of phonograph records disposed in groups in cradles, indicated in the drawing by the numerals 10, 11 and 12. Each of the cradles 10, 11 and 12 comprises a two-part assembly of identical molded sections, as shown in Figures 3, 4 and 5, wherein a cradle is shown as comprising a side section 13 in opposed relation to a side section 14 so that integrally formed end sections 15 and 16, respectively, on the side sections 13 and 14 interengage recesses 17 and 18 in the sections 14 and 13, respectively. The side sections 13 and 14 also engage each other at a point midway between the end sections 15 and 16 to form a hub, the hub sections being indicated by the numerals 19 and 20, respectively.

In Figures 3, 4 and 5 of the drawings the hub sections 19 and 20 are shown forming a hollow passageway 21 therethrough, which passageway 21 provides for the placement of a pivot rod such as shown in Figures 1 and 2 and indicated by the numeral 22. The pivot rod 22 supports the plurality of phonograph record racks 10, 11 and 12 in elevated relation to a supporting surface and is in turn held by a plurality of brackets 23, a detail of which may be seen in Figure 7 of the drawings.

Figure 7:
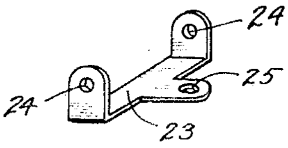
Figure 7 is a perspective view of a mounting bracket shown in Figures 1 and 2.

By referring to Figure 7 of the drawings it will be seen that the bracket 23 has upturned arms with openings 24 therein and a horizontal extension on the plane of the bracket 23 with an opening 25 therein so that the bracket 23 can be secured to a supporting surface such as, for example, the bottom of a radio cabinet.

Figure 6:
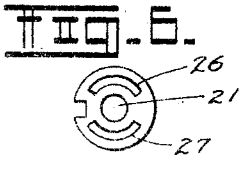
Figure 6 is a vertical section taken on line 6—6 of Figure 5.

By referring again to Figures 5 and 6 of the drawings it will be seen that each of the cradles 10, 11 and 12 is formed of the oppositely disposed, interengaged side sections 13 and 14, it being observed that the side section 13 is identical with the side section 14 and when they are positioned in face-to-face engagement, as shown in Figure 3, portions of the end sections 15 and 16, respectively, engage the recesses 17 and 18 while bosses on the hub portions 19 and 20 engage registering recesses. The bosses and recesses are illustrated in greater detail in Figures 5 and 6 of the drawings and by referring thereto they will be seen to be indicated by the numerals 26 and 27, respectively.

As is well known in assembling parts molded of various plastic materials, the side sections 13 and 14 may be positioned in opposed adjacent relation and cemented to one another to form integral phonograph record racks as shown in Figures 1 and 2 and indicated by the numerals 10, 11 and 12. Each of the phonograph record racks in Figures 1 and 2 have relatively wide, transverse slots 28 formed in their opposite ends, which relatively wide slots have dovetailed overhanging edge sections so that name cards and the like may be slid therein, as shown. Each of the end sections 15 and 16 of each of the cradles 10, 11 and 12 are also provided with felt bumpers 29 preferably cemented in transversely extending grooves provided in the end sections. The records are positioned in the cradles so that they rest in two-point suspension on the felt bumpers 29, their lower depending curves clearing the hub constructions 19 and 20.

By referring again to Figure 1 of the drawings it will be seen that the cradle 10 is shown in retracted position and the cradles 11 and 12 are shown in open position wherein approximately one-fourth of their length will protrude beyond the front of a record cabinet in which the phonograph record rack may be positioned. In extended or open position the records may be readily accessible and it will be observed that only each individual group of records need be moved into extended or open position at one time although all may be so moved, if so desired.

The advantages of the phonograph record rack shown and described herein over the rack for phonograph records shown in my co-pending application for patent hereinbefore identified is primarily in the ease of formation and lowered cost of the structure shown herein. The simple formation of each of the phonograph record racks from identical side sections arranged in groups on a common pivot form an attractive inexpensive phonograph record rack which is capable of holding a number of phonograph records safely and conveniently and at no time capable of scratching or otherwise harming them.

It will thus be seen that an improved phonograph record rack has been disclosed which is particularly adapted for installation in a record compartment of a radio phonograph combination.

Having thus described my invention, what I claim is:

A cradle for a phonograph record rack and comprising a two-part assembly of identical elongated side plates having depending central sections with hub portions protruding therefrom and positioned with the hub portions in engagement with one another, each of the said side plates having an end section extending inwardly at right angles therefrom and each of the side plates having a recess formed in the side thereof at the end thereof opposite the inwardly extending end section formed thereon for registry with the inwardly extending end section of the other side plate, the cradle forming means for supporting a plurality of phonograph records therein in balanced relation with respect to the hub portions thereof and engaging the records in two-point suspension between said inwardly extending end sections.

CLARE L. HINSDALE.

REFERENCES CITED

The following references are of record in the file of this patent:

UNITED STATES PATENTS

| Number | Name | Date |
|---|---|---|
| 1,358,833 | Dolman | Nov. 16, 1920 |
| 1,914,564 | Grandjean | June 20, 1933 |